March 19, 1929.　　F. J. SCHLEICHER　　1,705,838
BOX
Filed Jan. 13, 1928

Inventor:
Frank J. Schleicher,
by Rippey & Kingsland
His Attorneys.

Patented Mar. 19, 1929.

1,705,838

UNITED STATES PATENT OFFICE.

FRANK J. SCHLEICHER, OF ST. LOUIS, MISSOURI.

BOX.

Application filed January 13, 1928. Serial No. 246,542.

This invention relates to boxes for candy and other materials, and has for an object the production of a device comprising a main box having in it a number of separate removable boxes, the upper edges of the said walls of which are approximately in a single plane below the plane of the edges of the side walls of the main box, in combination with a lid or cover for all of said boxes having a portion extending downwardly within the main box and a marginal rim portion extending to or beyond the outer surfaces of the walls of the main box, and constituting means for manual engagement for removal and placement of the lid or cover.

Another object of the invention is to provide a device of the character and type mentioned having a lid of novel and improved construction for covering the enclosed boxes as well as the main box.

Other objects will appear from the following description, reference being made to the drawing in which Fig. 1 is a perspective view of an embodiment of my improved box.

Figure 1:
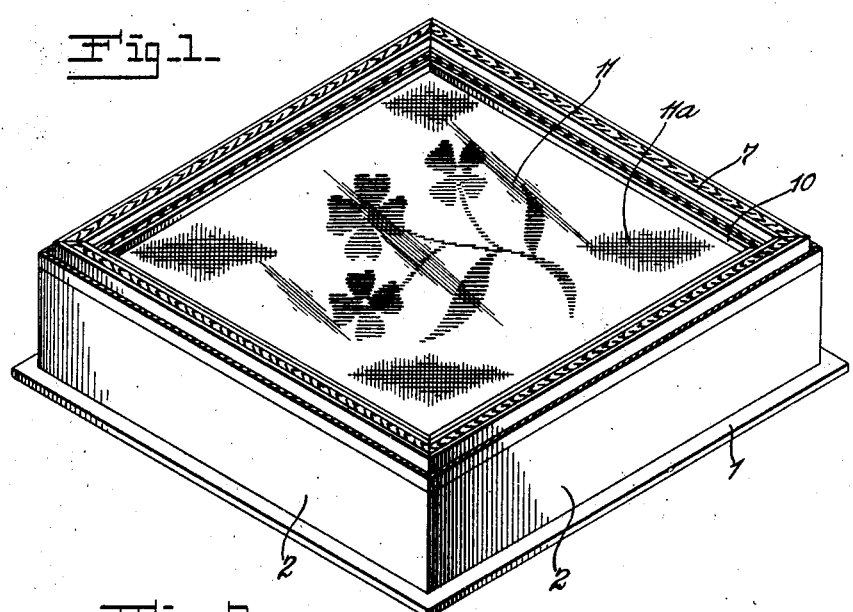
Figure 2:
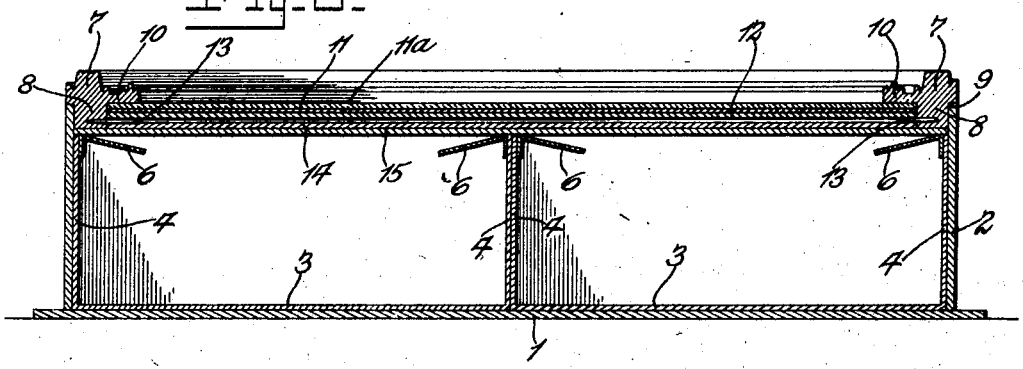
Fig. 2 is a cross sectional view taken transversely of the inside boxes.
Figure 3:
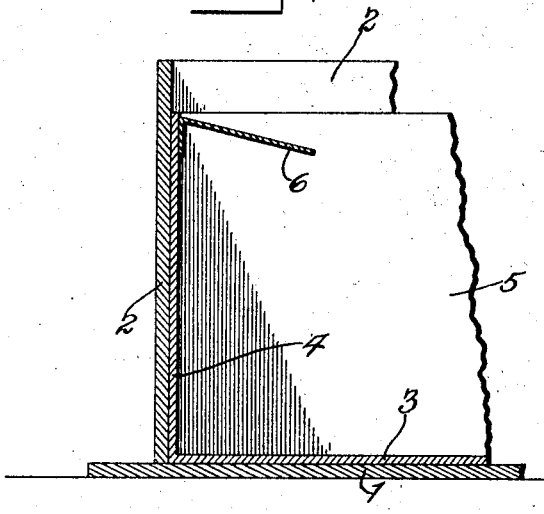
Fig. 3 is an enlarged vertical sectional view of one side of the box with the lid omitted.
Figure 4:
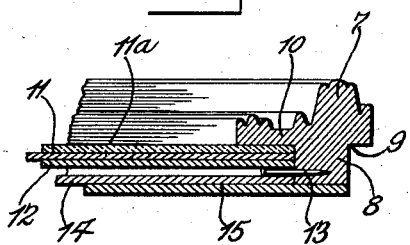
Fig. 4 is an enlarged cross sectional view of one side of the lid.

The main box comprises a bottom 1 secured to and rising from which are the side walls 2 having their upper edges in the same or approximately the same horizontal plane. These bottom and side walls of the box may be made of any suitable material possessing the necessary qualities of durability and strength. In the embodiment of the invention shown the side walls form a square enclosure to facilitate the placement therein of the removable boxes, though this feature may be varied, as desired.

The removable boxes in the main box may be as shown, or otherwise, as desired. Each of said removable boxes comprises a bottom wall 3, side walls 4 and end walls 5, the length of each of said boxes being approximately twice the width thereof. Thus, the two removable boxes may be placed side by side within the main box, the length of said removable boxes being approximately equal to the inside diameter of the main box in one direction, and the combined width of said removable boxes being approximately equal to the inside diameter of the main box in another direction. Thus, as shown, the removable boxes may be placed lengthwise in the main box in any direction. A foldable ornamental flap 6 is attached to each side wall 4, the same being designed and adapted to fold over upon the contents of the removable boxes. The upper edges of the side and end walls of the removable boxes are in a plane about one-fourth of an inch, more or less, below the plane of the upper edges of the side walls 2 of the main box.

The lid for covering the main and removable boxes comprises an inflexible frame composed of four side members 7 having their upper surfaces of ornamental configuration and each having on its underside a longitudinal rib or flange 8 spaced from the inner and outer edges of the respective side members 7. This provides an outside rabbet 9 in which the upper edges of the side walls 2 of the main box are received permitting the ribs or flanges 8 to enter the upper portion of the main box to hold the lid in position thereon. This spacing of the ribs or flanges 8 from the edges of the frame members 7 also provides a rabbeted portion 10 along the inside of the frame in which a transparent panel 11ª of glass or the like, and a separate ornamental panel 11 are secured. The panel 11 may be a pictorial illustration, or tapestry, or other decorative element. The transparent panel 11ª may be omitted, if desired. A backing for the ornamental panel is secured within the rabbeted portion 10 of the frame and, as shown, said backing comprises a section 12 of pasteboard or the like secured to the frame by fasteners 13; and an additional section 14 of pasteboard or the like secured to the section 12 by glue or other fastening means. The fasteners 13 are substantially embedded in the sections 12 and 13. The ornamental element 11, together with the backing sections 12 and 14, nearly fill the rabbeted space 10, so that the under side of the section 14 is approximately flush with the lower edges of the ribs or flanges 8. To the under side of said ribs or flanges 8 an ornamental lining 15 is attached by glue or other fastening means.

In use, the removable boxes are placed side by side in the main box and are filled with the material, such as candy, which they are to contain. The flaps 6 are folded upon the material in the removable boxes, after which the lid is placed in position on the main box so that the ribs or flanges 8 extend downwardly within the main box to a distance in which the ornamental lining 15 of the lid is close to the upper edges of the walls of the removable boxes. The outer edges of the lid extend over the upper edges of the walls 2 of the main box and preferably have their edges approximately in vertical continuation of the outer surfaces of said walls 2. Thus, the edges of the frame of the lid may be easily engaged manually in order to remove the lid from the box to obtain access to the contents. The ornamental frame of the lid rises substantially above the box and, therefore, serves the double function of affording proper strength to the lid and as an engageable portion for placement of the lid on the box and removal of the same therefrom. After the lid has served its purpose as such it may be applied to other ornamental and decorative uses.

What I claim is:—

1. A box comprising a bottom, and side walls rising from said bottom and forming an enclosure open at the top, in combination with a lid frame removably seated upon the upper edges of said walls and extending outwardly to the outer sides of said walls, a flange on said frame extending downwardly into the enclosure formed by said walls and holding said lid from lateral displacement, said frame being rabbeted on its lower inner edge, an ornamental panel mounted in the rabbeted portion of said frame, and stiff backing means for said panel secured in the rabbeted portion of said frame at the inner side of said panel.

2. A box comprising a bottom, and side walls rising from said bottom and forming an enclosure open at the top, in combination with a lid frame removably seated upon the upper edges of said walls and extending outwardly to the outer sides of said walls, a flange on said frame extending downwardly into the enclosure formed by said walls and holding said lid from lateral displacement, said frame being rabbeted on its lower inner edge, an ornamental panel mounted in the rabbeted portion of said frame, stiff backing means for said panel secured in the rabbeted portion of said frame at the inner side of said panel, and a lining for the lid secured to the inner edge of said flange.

3. A box comprising side walls forming an enclosure open at its upper end, a lid frame seated upon the upper edges of said walls and extending to the outer sides thereof and being manually engageable when in position, a projecting portion on said frame extending downwardly into the box and holding the lid from lateral displacement, a decorative panel secured within said frame, a stiff backing device for said panel secured within said frame at the inner side of said panel, and a lining attached to the inner side of said frame and covering said backing device.

FRANK J. SCHLEICHER.